United States Patent
Yano et al.

(10) Patent No.: US 6,821,647 B2
(45) Date of Patent: Nov. 23, 2004

(54) PHOSPHOR THIN FILM PREPARATION METHOD, AND EL PANEL

(75) Inventors: Yoshihiko Yano, Tokyo (JP); Tomoyuki Oike, Tokyo (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 10/125,477

(22) Filed: Apr. 19, 2002

(65) Prior Publication Data

US 2002/0192501 A1 Dec. 19, 2002

Related U.S. Application Data

(63) Continuation-in-part of application No. 09/866,719, filed on May 30, 2001, now Pat. No. 6,627,251.

(30) Foreign Application Priority Data

Apr. 19, 2001 (JP) ........................................ 2001-121591

(51) Int. Cl.[7] ........................... B32B 19/00; B32B 9/00; H01L 29/24; H01J 1/62; H01J 63/04
(52) U.S. Cl. .................... 428/690; 428/917; 252/301.4; 252/301.45; 313/503; 313/504; 257/102; 257/103
(58) Field of Search ................................ 428/690, 917; 252/301.4, 301.45; 313/503, 504; 257/102, 103; 427/64, 66

(56) References Cited

U.S. PATENT DOCUMENTS

| | | | | |
|---|---|---|---|---|
| 5,309,070 A | | 5/1994 | Sun et al. ................. | 313/503 |
| 5,314,759 A | * | 5/1994 | Harkonen et al. .......... | 428/690 |
| 5,656,888 A | | 8/1997 | Sun et al. ................. | 313/503 |
| 5,662,831 A | * | 9/1997 | Chadha ................... | 252/301.4 |
| 5,747,929 A | * | 5/1998 | Kato et al. ............... | 313/503 |
| 5,753,934 A | | 5/1998 | Yano et al. | |
| 5,801,105 A | | 9/1998 | Yano et al. | |
| 5,810,923 A | | 9/1998 | Yano et al. | |
| 5,828,080 A | | 10/1998 | Yano et al. | |

(List continued on next page.)

FOREIGN PATENT DOCUMENTS

| | | |
|---|---|---|
| JP | 8-134440 | 5/1996 |
| JP | 10-199675 | 7/1998 |
| JP | 2840185 | 10/1998 |

OTHER PUBLICATIONS

M. Kawanishi, et al., "CaAl$_2$S$_4$:Ce Thin Film EL Devices Prepared by the Two Targets Pulse Electron–Beam Evaporation", Technical Report of IEICE, EID98–113, Jan. 1999, pp. 19–24 (with English Abstract and Partial English Translation).

N. Miura, et al., "High–Luminance Blue–Emitting BaAl$_2$S$_4$:Eu Thin–Film Electroluminescent Devices", Jpn. J. Appl. Phys., vol. 38 (1999), pp. L1291–L1292.

(List continued on next page.)

*Primary Examiner*—Rena Dye
(74) *Attorney, Agent, or Firm*—Oblon, Spivak, McClelland, Maier & Neustadt, P.C.

(57) ABSTRACT

The invention provides a phosphor thin film having a high luminance, a satisfactory color purity enough to eliminate a need for filters, and a long luminance life, and best suited for each element of RGB in full color EL panels. The phosphor thin film of the invention comprises a matrix material and a luminescent center. The matrix material is an oxysulfide containing at least an alkaline earth element, Ga and/or In, sulfur (S) and oxygen (O). In the matrix material, the atomic ratio of oxygen to the total of oxygen and sulfur, O/(S+O), is from 0.1 to 0.85.

5 Claims, 3 Drawing Sheets

U.S. PATENT DOCUMENTS

| | | | |
|---|---|---|---|
| 5,919,515 A | | 7/1999 | Yano et al. |
| 5,955,213 A | | 9/1999 | Yano et al. |
| 5,985,404 A | | 11/1999 | Yano et al. |
| 6,045,626 A | | 4/2000 | Yano et al. |
| 6,072,198 A | * | 6/2000 | Sun et al. .................... 257/103 |
| 6,096,434 A | | 8/2000 | Yano et al. |
| 6,121,647 A | | 9/2000 | Yano et al. |
| 6,153,123 A | * | 11/2000 | Hampden-Smith et al. ...................... 252/301.45 |
| 6,198,208 B1 | | 3/2001 | Yano et al. |
| 6,242,858 B1 | * | 6/2001 | Sun ............................ 313/503 |
| 6,258,459 B1 | | 7/2001 | Noguchi et al. |
| 6,387,712 B1 | | 5/2002 | Yano et al. |
| 6,403,204 B1 | * | 6/2002 | Kitai et al. ................. 428/212 |
| 6,597,108 B2 | * | 7/2003 | Yano et al. ................. 313/503 |
| 6,614,173 B2 | * | 9/2003 | Yano et al. ................. 313/503 |
| 6,627,251 B2 | * | 9/2003 | Yano et al. ..................... 427/66 |
| 2002/0155317 A1 | * | 10/2002 | Yano et al. ................. 428/690 |
| 2002/0155318 A1 | * | 10/2002 | Yano et al. ................. 428/690 |

OTHER PUBLICATIONS

S. Oshio, et al., "Novel Electroluminescent Thin Films: Thiogallate–Type Phosphors", Display and Imaging, vol. 3, No. 2, pp. 181–187 (with English Abstract and Partial English Translation).

P.C. Donohue, et al., "The Synthesis and Photoluminescence of $M^{11}M_2^{111}(S,Se)_4$", J. Electrochem. Soc., vol. 121, No. 1, pp. 137–141.

I. Tanaka, et al., "Composition and Optical Properties of Blue–Emitting $BaAl_2S_4:Eu^{2+}$ Electroluminescent Thin Films", The $22^{nd}$ Seminar Data Photoelectric Inter–Conversion the $125^{th}$ Commission EL Department, May 26, 2000, pp. 16–21 (with English Concise Explanation and Partial English Translation).

P. Benalloul, et al., "$IIA–III_2–S_4$ Ternary Compounds: New Host Matrices for Full Color Thin Film Electroluminescence Displays", Appl. Phys. Lett., 63 (14), Oct. 4, 1993, pp. 1954–1956.

K.T. Le Thi, et al., "Investigation of the $MS–Al_2S_3$ Systems (M=Ca, Sr, Ba) and Luminescence Properties of Europlum-Doped Thioaluminates", Materials Science and Engineering, B14 (1992), pp. 393–397.

Sey–Shing Sun et al.; "High–Performance Alkaline–Earth Thiogallate Blue–Emitting ACTFEL Devices"; Journal of the SID; 4/4, 1996; pp. 305–309.

* cited by examiner

PHOSPHOR THIN FILM PREPARATION METHOD, AND EL PANEL

BACKGROUND OF THE INVENTION

1. Technical Field

This invention relates to an oxysulfide thin film having a light emitting function, and more particularly, to a phosphor thin film used as a light-emitting layer in inorganic EL devices or the like, a method of preparing the same and an EL panel using the same.

2. Background Art

Figure 2:
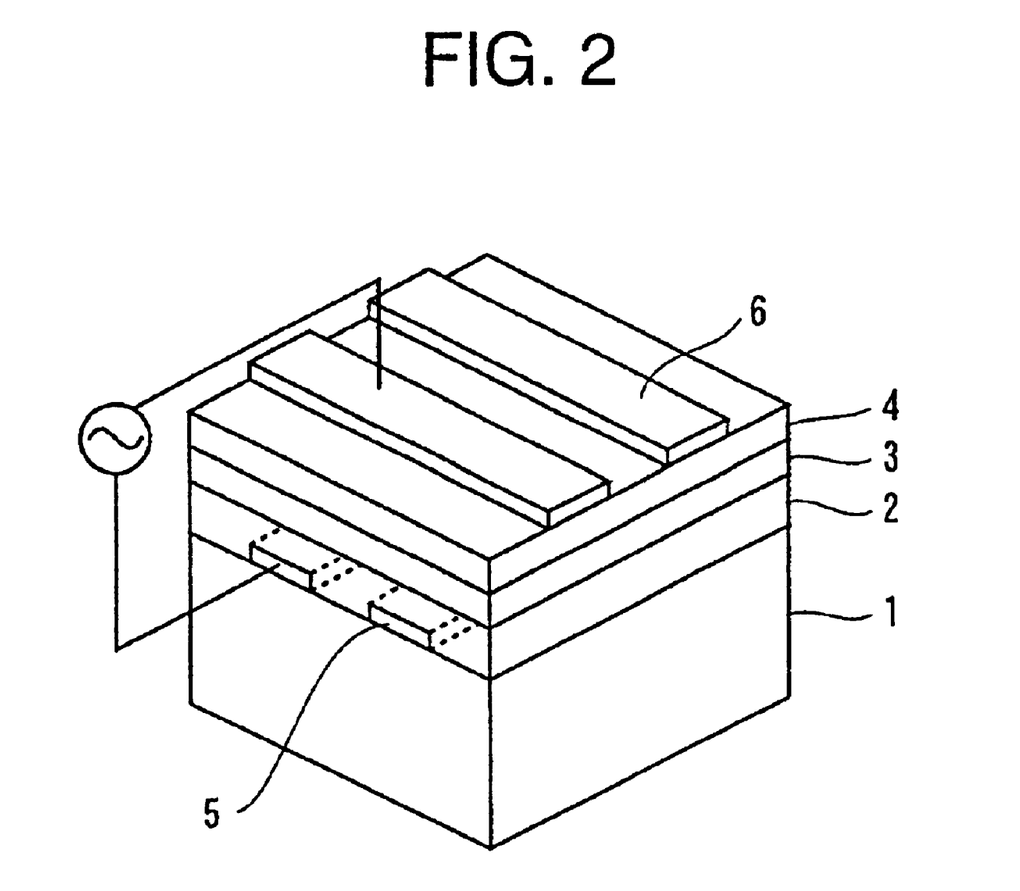
FIG. 2 is a perspective view of a portion cut out of an inorganic EL device of double insulation structure.

In the recent years, active research works have been made on thin-film EL devices as small-size and large-size, light-weight flat panel displays. A monochromatic thin-film EL display using a phosphor thin film of manganese-doped zinc sulfide capable of emitting yellowish orange light has already become commercially practical as a double insulation structure using thin-film insulating layers 2 and 4 as shown in FIG. 2. In FIG. 2, a predetermined pattern of lower electrodes 5 is formed on a substrate 1, and a first insulating layer 2 is formed on the lower electrode-bearing substrate 1. On the first insulating layer 2, a light-emitting layer 3 and a second insulating layer 4 are successively formed. On the second insulating layer 4, a predetermined pattern of upper electrodes 6 is formed so as to construct a matrix circuit with the lower electrodes 5.

Thin-film EL displays must display images in color in order that they find use as computer, TV and similar monitors. Thin-film EL displays using sulfide phosphor thin films are fully reliable and resistant to environment, but at present regarded unsuitable as color displays because EL phosphors required to emit light in the primaries of red, green and blue have poor characteristics. Engineers continued research on SrS:Ce (using SrS as a matrix material and Ce as a luminescent center) and ZnS:Tm as a candidate for the blue light-emitting phosphor, ZnS:Sm and CaS:Eu as a candidate for the red light-emitting phosphor, and ZnS:Tb and CaS:Ce as a candidate for the green light-emitting phosphor.

These phosphor thin films capable of emitting light in the primaries of red, green and blue suffer from problems of emission luminance, emission efficiency and color purity. Thus color EL panels have not reached the commercial stage. Referring to the blue color among others, a relatively high luminance is achieved using SrS:Ce. However, its luminance is still short as the blue color for full color display and its chromaticity is shifted toward green. There is a desire to have a better blue light-emitting layer.

To solve these problems, thiogallate and thioaluminate base blue phosphors such as $SrGa_2S_4$:Ce, $CaGa_2S_4$:Ce, and $BaAl_2S_4$:Eu were developed as described in JP-A 7-122364, JP-A 8-134440, Shingaku Technical Report, EID 98-113, pp. 19–24, and Jpn. J. Appl. Phys., Vol. 38 (1999), pp. L1291–1292. These thiogallate base phosphors are satisfactory in color purity, but suffer from a low luminance and especially, difficulty to form a thin film of uniform composition because of the multi-component composition. It is believed that thin films of quality are not obtainable because of poor crystallinity resulting from inconvenient composition control, formation of defects resulting from sulfur removal, and admittance of impurities; and these factors lead to a failure to increase the luminance. In particular, thioaluminate base phosphors are quite difficult to control their composition.

In order to develop practical full color EL panels, processes of preparing phosphor thin films for blue, green and red light in a consistent manner and at a low cost are necessary. Since matrix materials and luminescent center materials of phosphor thin films individually have differing chemical or physical properties as described above, the preparation method differs depending on the identity of the phosphor thin film. Then, if film depositing conditions are set such that a phosphor thin film of a specific composition may produce a high luminance, a phosphor thin film for another color fails to develop a high luminance. This necessitates a plurality of film forming apparatus for the overall process of manufacturing a full color EL panel. The manufacturing process becomes very complex, and the cost of panel manufacture increases.

Moreover, the EL spectra of the aforementioned blue, green and red EL phosphor thin films are all broad. When they are used in a full color EL panel, RGB necessary as the panel must be cut out of the EL spectra of the EL phosphor thin films, using filters. Use of filters complicates the manufacture process and, still worse, brings about a lowering of luminance. When RGB is taken out through filters, the luminance of blue, green and red EL phosphor thin films is lost by 10 to 50% or more so that the luminance of the panel is reduced below the practically acceptable level.

In order that an EL panel perform on a practical level, it is required to maintain a luminance over a long period of time, that is, have a long luminance life.

To solve the above-discussed problems, there remains a need for red, green and blue phosphor thin films capable of emitting light at a high luminance and a satisfactory color purity enough to eliminate a need for filters, and having a long luminance life. It is also required that such red, green and blue phosphor thin films be prepared by an identical film-forming method or film-forming apparatus.

SUMMARY OF THE INVENTION

An object of the invention is to provide a phosphor thin film having a high luminance, a satisfactory color purity enough to eliminate a need for filters, and a long luminance life, and best suited for each element of RGB in full color EL panels. Another object of the invention is to make it possible to manufacture a full color EL panel using such phosphor thin films, through simple steps and at a reduced cost.

The above and other objects are achieved by the invention which is defined below as (1) to (10).

(1) A phosphor thin film comprising a matrix material and a luminescent center, wherein the matrix material is an oxysulfide containing at least an alkaline earth element, Ga and/or In, sulfur (S) and oxygen (O), the atomic ratio of oxygen to the total of oxygen and sulfur, O(S+O), in the matrix material is in the range: O/(S+O)=0.1 to 0.85.

(2) The phosphor thin film of (1) having the following compositional formula:

compositional formula $A_xB_yO_zS_w$:M wherein M is a metal element serving as the luminescent center, A is at least one element selected from the group consisting of Mg, Ca, Sr, and Ba, B is at least one element selected from Ga, In and Al, with the proviso that B essentially contains Ga and/or In, x is in the range of 1 to 5, y is in the range of 1 to 15, z is in the range of 3 to 30, and w is in the range of 3 to 30.

(3) The phosphor thin film of (1) or (2) wherein the luminescent center is provided by a rare earth element.

(4) A phosphor thin film comprising a matrix material and a luminescent center, wherein the matrix material is an oxysulfide containing at least an alkaline earth element, Ga and/or In, sulfur and oxygen, and the luminescent center is Eu.

(5) An EL panel having the phosphor thin film of any one of (1) to (4).

(6) A method for preparing the phosphor thin film of any one of (1) to (4), comprising the steps of:

forming a sulfide thin film, and annealing the thin film in an oxidizing atmosphere into an oxysulfide thin film.

(7) A method for preparing the phosphor thin film of any one of (1) to (4), comprising the step of forming an oxysulfide thin film by a reactive evaporation process using at least a material containing an alkaline earth element in sulfide or metal form and a material containing gallium sulfide and/or indium sulfide as the evaporation source, and oxygen gas as the reactive gas.

(8) A method for preparing the phosphor thin film of any one of (1) to (4), comprising the steps of:

forming a sulfide thin film by an evaporation process using at least a material containing an alkaline earth element in sulfide or metal form and a material containing gallium sulfide and/or indium sulfide as the evaporation source, and annealing the sulfide thin film in an oxidizing atmosphere into an oxysulfide thin film.

(9) A method for preparing a phosphor thin film according to (8) wherein the evaporation process is a reactive evaporation process using hydrogen sulfide gas as the reactive gas.

(10) A method for preparing a phosphor thin film according to any one of (7) to (9) wherein the evaporation source containing the alkaline earth sulfide contains the luminescent center.

Function

The inventors first formed thin films of alkaline earth thiogalates and alkaline earth thioindates, which are easier to control the composition than alkaline earth thioaluminates, as the phosphor intended for EL application. EL devices were prepared using the thin films, but they failed to produce the desired light emission. The thin films had an emission luminance of 2 cd/m$^2$ at the highest. The luminance must be increased in order that the thin films be applied to EL panels.

Based on these empirical results, the inventors continued research on phosphor thin films of the above composition and reached the present invention. It has been found that by adding a certain amount of oxygen to alkaline earth thiogallate and alkaline earth thioindate base matrix materials to form oxysulfides, an outstanding increase of luminance and a substantial lengthening of luminance life are accomplished.

By adding various luminescence centers corresponding to the desired colors of light emission to matrix materials based on alkaline earth thiogallate and alkaline earth thioindate and containing oxygen, there are obtained phosphor thin films capable of emitting red, green and blue light of high color purity at a high luminance. Additionally, these phosphor thin films can be formed using the reactive evaporation process. Then the present invention is effective for reducing the cost of full color EL panels.

DESCRIPTION OF THE PREFERRED EMBODIMENTS

Several embodiments of the invention are described in detail.

The phosphor thin film of the invention includes a matrix material and a luminescent center. The matrix material is an oxysulfide containing at least an alkaline earth element, Ga and/or In, sulfur (S) and oxygen (O).

It is preferred that the phosphor thin film of the invention has been crystallized, although an amorphous state having no definite crystalline structure is acceptable. The crystals present in the phosphor thin film of the invention are preferably one or more of $A_5B_2S_8$, $A_4B_2S_7$, $A_2B_2S_5$, $AB_2S_4$, $AB_4S_7$, $A_4B_{14}S_{25}$, $AB_8S_{13}$, and $AB_{12}S_{19}$ wherein A stands for an alkaline earth element and B stands for Ga, In and Al, with the inclusion of $AB_2S_4$ crystals being especially preferred. In the phosphor thin film, O may substitute for part of S in the crystals.

As used in the specification, the alkaline earth element is selected from Be, Mg, Ca, Sr, Ba and Ra. Of these, Mg, Ca, Sr and Ba are preferred, with Ba and Sr being especially preferred.

The element to be combined with the alkaline earth element is Ga and/or In, or Ga and/or In plus Al, in which the combination of these elements is arbitrary.

The phosphor thin film of the invention preferably has the following compositional formula.

$A_xB_yO_zS_w$:M

In the compositional formula, M stands for a metal element serving as the luminescence center; A stands for at least one element selected from among Mg, Ca, Sr, and Ba; and B stands for at least one element selected from among Ga, In and Al with the proviso that B essentially contains Ga and/or In. Specifically, B is Ga and/or In, a mixture of Ga and Al, a mixture of In and Al, or a mixture of Ga, In and Al.

The atomic ratio of Al in the element B is preferably up to 0.3. Too high an atomic ratio of Al makes it difficult to control the composition of phosphor thin film, and compromises the advantages of the invention that a high luminance and a long life are obtainable by optimizing the composition of alkaline earth thiogallate or alkaline earth thioindate.

In the above formula, x, y, z and w denote molar ratios of elements A, B, O and S, and are preferably in the ranges of:

x=1 to 5, y=1 to 15, z=3 to 30, and w=3 to 30.

In the matrix material, the atomic ratio O/(S+O) of oxygen to the total of oxygen and sulfur, that is, z/(w+z) in the above compositional formula is preferably from 0.1 to 0.85, more preferably from 0.1 to 0.5, and more preferably from 0.1 to 0.4. By controlling the oxygen content in this range, the luminance life is critically lengthened and a high luminance is obtainable.

It is noted that when $A_xB_yO_zS_w$ is a compound of a stoichiometric composition, this compound is considered to consist of $x\{A(O,S)\}$ and $(y/2)\{B_2(O,S)_3\}$. Accordingly, $z+w=x+3y/2$ gives a substantially stoichiometric composition. To produce a high luminance of light emission, the phosphor thin film should preferably have a composition close to the stoichiometry, and specifically, $$0.9 \leq (x+3y/2)/(z+w) \leq 1.1$$

is preferred.

The composition of the phosphor thin film can be ascertained by x-ray fluorescence analysis (XRF), x-ray photoelectron spectroscopy (XPS), transmission electron microscopy-energy dispersive x-ray spectroscopy (TEM-EDS) or the like.

Oxygen is effective for outstandingly enhancing the emission luminance of phosphor thin films. Although the light emitting device has a lifetime in that the luminance drops with the lapse of light emitting time, the addition of oxygen improves the lifetime performance and prevents the luminance from dropping. The addition of oxygen to sulfide promotes crystallization of the matrix material during film deposition or during post treatment such as annealing after film deposition, and permits the luminescent center such as rare earth element to undertake effective transition within the compound crystal field, producing stable light emission at a high luminance. Also, the matrix material itself is stable in air, as compared with pure sulfide. This is probably because the stable oxide component protects the sulfide component in the film from the ambient air.

The element M contained as the luminescent center is one or more elements selected from among transition metal elements such as Mn and Cu, rare earth metal elements, lead (Pb) and bismuth (Bi). The rare earth element is selected from among at least Sc, Y, La, Ce, Pr, Nd, Gd, Tb, Ho, Er, Tm, Lu, Sm, Eu, Dy and Yb. Specifically, Eu and Ce are preferred for the blue phosphor, Eu, Ce, Tb and Ho are preferred for the green phosphor, and Pr, Eu, Sm, Yb and Nd are preferred for the red phosphor. Among these, Eu, Pr, Tb and Sm are preferred for combination with the matrix material. The more preferred elements are Eu and Sm, with Eu being most preferred. An appropriate amount of the luminescent center added is 0.1 to 10 at % based on the alkaline earth element.

As described above, the phosphor thin film having oxygen added thereto is believed to produce stable light emission at a high luminance since the luminescent center such as rare earth element undertakes effective transition within the compound crystal field. This effect becomes outstanding only with the luminescent center which is sensitive to the crystal field, and especially when the luminescent center is $Eu^{2+}$.

Among alkaline earth thiogallates, $SrGa_2S_4$:Ce has been under study as the phosphor for blue emission. Ce has the problem that $Ce^{3+}$ and $Ce^{4+}$ are co-present in the matrix material as is known to be problematic with SrS:Ce. As a consequence, the emission spectrum does not have a single peak, and color control becomes difficult. In contrast, when Eu is added, a single emission peak is obtained. It is also believed that the reason why the luminance improving effect due to oxygen addition is low in the event where Ce is added is correlated to the co-presence of $Ce^{3+}$ and $Ce^{4+}$.

The phosphor thin film is preferably prepared, for example, by the following processes. The following description refers to a $Ba_xGa_yO_zS_w$:Eu phosphor thin film as a typical example.

In a first process, a phosphor thin film is formed by reactive evaporation using a barium gallate pellet having Eu added as the evaporation source and $H_2S$ gas as the reactive gas. The $H_2S$ gas is used in order to introduce sulfur into the film.

A second process relies on a multi-source evaporation technique. The preferred procedures of multi-source evaporation include, for example, (1) binary reactive evaporation using a barium oxide pellet having Eu added thereto and a gallium oxide pellet as the evaporation source, and $H_2S$ gas as the reactive gas;

(2) binary vacuum evaporation using a barium sulfide pellet having Eu added thereto and a gallium oxide pellet as the evaporation source, but no reactive gas;

(3) binary vacuum evaporation using a barium oxide pellet having Eu added thereto and a gallium sulfide pellet as the evaporation source, but no reactive gas; and (4) binary reactive evaporation using a barium sulfide pellet having Eu added thereto and a gallium sulfide pellet as the evaporation source, and $O_2$ gas as the reactive gas.

It is acceptable to use metallic Eu and metallic Ba as the evaporation source instead of the barium oxide pellet having Eu added in the procedure (1), and instead of the barium sulfide pellet having Eu added in the procedure (4).

In the especially preferred embodiment of the second process, an oxysulfide thin film is obtained by placing at least a gallium sulfide evaporation source and an evaporation source of barium sulfide having a luminescent center added thereto in a vacuum chamber, admitting oxygen ($O_2$) gas into the vacuum chamber, and evaporating gallium sulfide and barium sulfide substance from the respective sources and depositing the evaporated substances on a substrate while binding the substances with oxygen.

In a third process, oxygen is introduced into a phosphor thin film by anneal treatment. That is, once a sulfide thin film is formed, it is annealed in an oxidizing atmosphere to convert to an oxysulfide thin film.

The preferred evaporation procedures used in the third process include, for example, (1) binary reactive evaporation using a barium sulfide pellet having Eu added thereto and a gallium sulfide pellet as the evaporation source, and $H_2S$ gas as the reactive gas;

(2) binary reactive evaporation using a barium sulfide pellet having Eu added thereto and a gallium sulfide pellet as the evaporation source, but no reactive gas;

(3) binary vacuum evaporation using a barium thiogallate pellet having Eu added thereto as the evaporation source; and (4) binary reactive evaporation using a barium thiogallate pellet having Eu added thereto as the evaporation source, and $H_2S$ gas as the reactive gas.

It is acceptable to use metallic Eu and metallic Ba as the evaporation source instead of the barium sulfide pellet having Eu added in the above procedures (1) and (2).

The anneal treatment in the third process is carried out in an oxidizing atmosphere such as oxygen or air. The oxygen concentration in the annealing atmosphere is preferably at least the oxygen concentration in air. The annealing temperature is preferably set in the range of 500° C. to 1,000° C., and more preferably in the range of 600° C. to 800° C. The annealing causes oxygen to be introduced into the phosphor thin film and substantially improves the crystallinity of the phosphor thin film.

Among the procedures of the third process, the use of the procedure (1) or (2) as the evaporation method is especially preferred.

Among the above-mentioned processes, the third process is most preferred. The third process facilitates to control the oxygen content in the phosphor thin film and to form a phosphor thin film having high crystallinity.

The element added as the luminescent center to the evaporation source is in a metal, fluoride, oxide or sulfide form. Since the content of the luminescent center in the evaporation source is different from the content of the luminescent center in the thin film which is formed using that evaporation source, the content of the luminescent center in the evaporation source is adjusted so as to provide the desired content in the thin film.

In the above processes, it is preferred that the luminescent center be previously added to the alkaline earth sulfide, and most preferably, the luminescent center be present as a sulfide (e.g., EuS) in the alkaline earth sulfide (e.g., BaS) evaporation source. It is possible to uniformly add less than several percents by mole of the luminescent center to the alkaline earth sulfide. When a pellet, powder, compact or mass of the alkaline earth sulfide having the luminescent center added is evaporated, the luminescent center evaporates together with the alkaline earth sulfide and reaches the substrate so that the minor amount of the luminescent center is distributed in the thin film being deposited in a well controlled manner. Since the alkaline earth sulfide serves as a carrier for the impurity (luminescent center), 1 mol % or less of the luminescent center can be precisely and uniformly added to the thin film.

The alkaline earth sulfide used as the evaporation source may have a deviation within about 10% from the stoichiometry. However, when the luminescent center is added to the alkaline earth sulfide to form the evaporation source, the composition of the alkaline earth sulfide should preferably be as close to the stoichiometry as possible, in order to increase the precision of the addition amount of the luminescent center.

In the above-described processes, the temperature of the substrate during the evaporation may be at room temperature to 600° C., preferably 100 to 300° C. If the substrate temperature is too high, the thin film of matrix material may have more asperities on its surface and contain pin holes therein, giving rise to the problem of current leakage on EL devices. Also the thin film can be colored brown. For this reason, the aforementioned temperature range is preferable.

The oxysulfide thin film thus formed is preferably a highly crystalline thin film. Crystallinity can be evaluated by x-ray diffraction, for example. To promote crystallinity, the substrate temperature is set as high as possible. Not only the above-mentioned anneal treatment in an oxidizing atmosphere, but also anneal treatment in vacuum, $N_2$, Ar, sulfur vapor or $H_2S$ is effective for improving crystallinity.

No particular limits are imposed on the thickness of the phosphor thin film. However, too thick a film requires an increased drive voltage whereas too thin a film results in a low emission efficiency. Illustratively, the phosphor thin film is preferably about 100 to 2,000 nm thick, especially about 150 to 700 nm thick although the thickness varies depending on the identity of the phosphor material.

The pressure during evaporation is preferably $1.33 \times 10^{-4}$ to $1.33 \times 10^{-1}$ Pa ($1 \times 10^{-6}$ to $1 \times 10^{-3}$ Torr). More preferably, both the amounts of $O_2$ gas for adding oxygen and $H_2S$ gas for promoting sulfidation may be adjusted to maintain a pressure of $6.65 \times 10^{-3}$ to $6.65 \times 10^{-2}$ Pa ($5 \times 10^{-5}$ to $5 \times 10^{-4}$ Torr). If the pressure exceeds the range, the operation of the electron gun becomes unstable, and composition control becomes very difficult. The feed rate of $H_2S$ or $O_2$ gas is preferably 5 to 200 standard cubic centimeters per minute (SCCM), especially 10 to 30 SCCM although it varies depending on the power of the vacuum system.

If desired, the substrate may be moved or rotated during evaporation. By moving or rotating the substrate, the deposited film becomes uniform in composition and minimized in the variation of thickness distribution.

When the substrate is rotated, the rotational speed is preferably at least about 10 rpm, more preferably about 10 to 50 rpm, and especially about 10 to 30 rpm. If an attempt is made to increase the rotational speed of the substrate above the range, it becomes difficult to provide a seal to maintain the vacuum chamber gas-tight. If the rotational speed of the substrate is too low, compositional gradation may occur in the thickness direction within the chamber so that the resulting phosphor thin film may have poor characteristics. The means for rotating the substrate may be any well-known rotating mechanism including a power transmission/gear mechanism having a power source such as a motor or hydraulic rotational mechanism combined with gears, belts, pulleys and the like.

The means for heating the evaporation source and the substrate may be selected, for example, from tantalum wire heaters, sheath heaters and carbon heaters, as long as they have the predetermined thermal capacity, reactivity or the like. The temperature reached by the heating means is preferably in the range of about 100 to about 1,400° C., and the precision of temperature control is about ±1° C., preferably about ±0.5° C. at 1,000° C.

Figure 1:
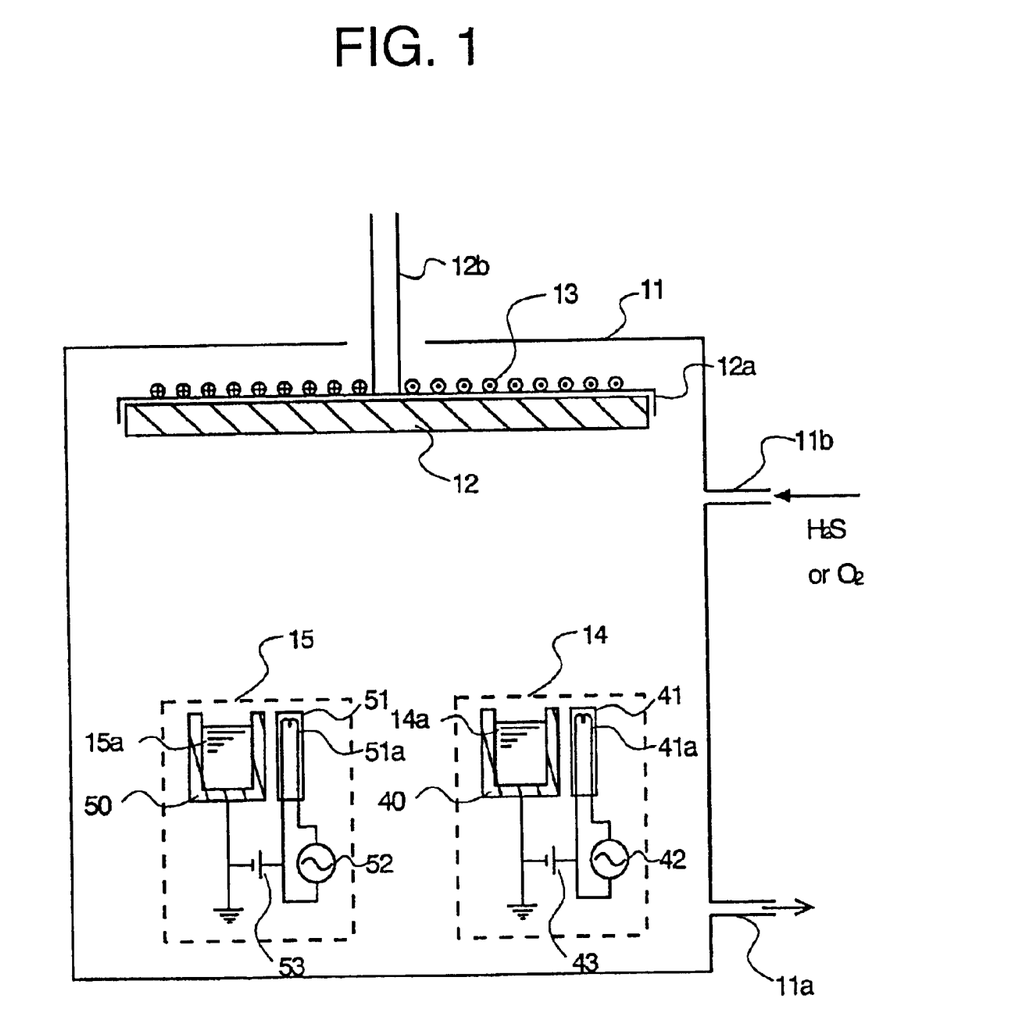
FIG. 1 is a schematic cross-sectional view showing an exemplary construction of the evaporation apparatus used in the manufacturing method of the invention.

FIG. 1 illustrates one exemplary construction of the apparatus for forming the light emitting layer according to the invention. Reference is made to an embodiment wherein oxygen-added barium thiogallate:Eu is produced by using gallium sulfide and barium sulfide as the evaporation sources and admitting oxygen during evaporation. In the illustrated embodiment, a substrate 12 on which the light emitting layer is to be deposited, and EB evaporation sources 14 and 15 are disposed within a vacuum chamber 11.

The electron beam (EB) evaporation sources 14 and 15 serving as means for evaporating gallium sulfide and barium sulfide include crucibles 40 and 50 which contain gallium sulfide 14a and barium sulfide 15a having a luminescent center added thereto, and electron guns 41 and 51 having electron emitting filaments 41a and 51a built therein, respectively. Built in the electron guns 41, 51 are mechanisms for controlling electron beams. To the electron guns 41, 51 are connected ac power supplies 42, 52 and bias power supplies 43, 53.

The electron guns 41, 51 produce electron beams at predetermined powers in a controlled manner, which are irradiated to the crucibles 40, 50 for evaporating the gallium sulfide 14a and the barium sulfide 15a having a luminescent center added thereto in a predetermined ratio. Also employable is a process in which multi-source simultaneous evaporation is performed using a single electron gun, which is known as multi-source pulse evaporation process.

The vacuum chamber 11 has an exhaust port 11a through which the chamber is evacuated to establish a predetermined vacuum in the chamber. The vacuum chamber 11 also has a reactive gas inlet port 11b through which oxygen or hydrogen sulfide gas is admitted into the chamber.

The substrate 12 is fixedly secured to a holder 12a. The holder 12a has a shaft 12b which is rotatably held by an outside rotating shaft mount (not shown) so that the vacuum may be maintained in the chamber 11. The shaft 12b is adapted to be rotated at a predetermined speed by a rotating means (not shown). A heating means 13 in the form of a heater wire is closely secured to the substrate holder 12a so that the substrate may be heated and maintained at the desired temperature.

Using the illustrated apparatus, vapors of gallium sulfide and barium sulfide are evaporated from the EB evaporation sources 14, 15 and deposited on the substrate 12 where they are bound with the oxygen admitted to thereby form an oxysulfide thin film. By rotating the substrate 12 during the evaporation process if desired, the thin film being deposited can be made more uniform in composition and thickness distribution. Although two EB evaporation sources are used in the illustrated embodiment, the evaporation source is not limited to an EB evaporation source, and another evaporation source such as a resistive heating evaporation source may be used depending on a particular material and conditions used.

There have been described the phosphor thin film material and the method of manufacture by evaporation according to the invention, by which a phosphor thin film capable of light emission at a higher luminance and having a long lifetime can be easily formed.

Using the phosphor thin film of the invention, an inorganic EL device is manufactured, for example, to the structure shown in FIG. 2.

FIG. 2 is a perspective view showing a device of the double insulation structure as an exemplary inorganic EL device using the phosphor thin film of the invention as a light emitting layer 3. In FIG. 2, a predetermined pattern of lower electrodes 5 is formed on a substrate 1, and a first thick insulating layer (or thick-film dielectric layer) 2 is formed on the lower electrodes 5. On the first insulating layer 2, a light-emitting layer 3 and a second insulating layer (or thin-film dielectric layer) 4 are successively formed. On the second insulating layer 4, a predetermined pattern of upper electrodes 6 is formed so as to construct a matrix circuit with the lower electrodes 5.

Between the substrate 1, electrodes 5, 6, first insulating layer 2 and second insulating layer 4, there may be disposed intermediate layers such as a layer for enhancing bond, a layer for mitigating stress, and a layer for preventing reaction. The thick film may be improved in smoothness as by polishing its surface or using a smoothing layer.

The substrate used herein is not critical as long as it is constructed of a material having a heat resistant temperature or melting point of at least 600° C., preferably at least 700° C., especially at least 800° C. so that the substrate may withstand the thick-film forming temperature, the forming temperature of the light emitting layer and the annealing temperature of the light emitting layer, and the substrate maintains the predetermined strength. Illustrative examples include ceramic substrates of glass, alumina ($Al_2O_3$), forsterite ($2MgO.SiO_2$), steatite ($MgO.SiO_2$), mullite ($3Al_2O_3.2SiO_2$), beryllia (BeO), aluminum nitride (AlN), silicon nitride ($Si_3N_4$), and silicon carbide (SiC+BeO) as well as heat resistant glass substrates of crystallized glass or the like. Of these, alumina substrates and crystallized glass substrates are especially preferable. Where heat transfer is necessary, substrates of berillia, aluminum nitride or silicon carbide are preferred.

Also useful are quartz substrates and heat oxidized silicon wafers as well as metal substrates such as titanium, stainless steel, Inconel and iron base materials. Where electroconductive substrates such as metal substrates are used, a structure in which an insulating thick film having a lower electrode buried therein is formed on a substrate is preferred.

A material having a relatively high permittivity selected from among well-known thick-film dielectric material is preferably used as the thick-film dielectric layer (first insulating layer). Of these materials, for example, lead titanate, lead niobate and barium titanate based materials are preferred.

The thick-film dielectric layer has a resistivity of at least $10^8$ Ω·cm, especially about $10^{10}$ to $10^{18}$ Ω·cm. Its relative permittivity ε is preferably about 100 to 10,000. Its thickness is preferably 5 to 50 μm, especially 10 to 30 μm.

The thick-film dielectric layer is formed by any desired method. Methods capable of relatively easily forming films of 10 to 50 μm thick, for example, the sol-gel method and printing/firing method are preferred.

Where the printing/firing method is employed, a material is fractionated to an appropriate particle size and mixed with a binder to form a paste having an appropriate viscosity. Using the paste, a coating is formed on a substrate by a screen printing technique, and dried. The coating is fired at an appropriate temperature, yielding a thick film.

Examples of the preferred material of which the thin-film dielectric layer (second insulating layer) is made include silicon oxide ($SiO_2$), silicon nitride (SiN), tantalum oxide ($Ta_2O_5$), strontium titanate ($SrTiO_3$), yttrium oxide ($Y_2O_3$), barium titanate ($BaTiO_3$), lead titanate ($PbTiO_3$), lead zirconate titanate (PZT), zirconia ($ZrO_2$), silicon oxynitride (SiON), alumina ($Al_2O_3$), lead niobate, and a mixture of $Pb(Mg_{1/3}Ni_{2/3})O_3$ and $PbTiO_3$ (PMN-PT). The thin-film dielectric layer may be constructed by a single layer or multiple layers containing at least one of the foregoing materials. In forming the thin-film dielectric layer, any of conventional methods such as evaporation, sputtering and CVD may be used. The thin-film dielectric layer preferably has a thickness of about 50 to 1,000 nm, especially about 100 to 500 nm.

The lower electrode is formed between the substrate and the first insulating layer or within the first insulating layer. The lower electrode is exposed to high temperature during the annealing of the light emitting layer and also to high temperature during formation of the first insulating layer when the first insulating layer is constructed by a thick film. It is then preferred that the material of which the lower electrode is made be heat resistant and specifically, contain as a main component one or more elements selected from palladium, rhodium, iridium, rhenium, ruthenium, platinum, tantalum, nickel, chromium and titanium.

The upper electrode is preferably a transparent electrode which is transmissive to light in the predetermined emission wavelength region because the emitted light often exits from the opposite side to the substrate. When the substrate and insulating layer are transparent, a transparent electrode may also be used as the lower electrode because this permits the emitted light to exit from the substrate side. Use of transparent electrodes of ZnO, ITO or the like is especially preferred. ITO generally contains $In_2O_3$ and SnO in stoichiometry although the oxygen content may deviate somewhat therefrom. An appropriate proportion of $SnO_2$ mixed with $In_2O_3$ is about 1 to 20%, more preferably about 5 to 12% by weight. For IZO, an appropriate proportion of ZnO mixed with $In_2O_3$ is generally about 12 to 32% by weight.

Also the electrode may be a silicon-based one. The silicon electrode may be either polycrystalline silicon (p-Si) or amorphous silicon (a-Si), or even single crystal silicon if desired.

In addition to silicon as the main component, the silicon electrode is doped with an impurity for imparting electric conductivity. Any dopant may be used as the impurity as long as it can impart the desired conductivity. Use may be made of dopants commonly used in the silicon semiconductor art. Illustratively, B, P, As, Sb and Al are preferred. The preferred dopant concentration is about 0.001 to 5 at %.

In forming the electrode from these materials, any of conventional methods such as evaporation, sputtering, CVD, sol-gel and printing/firing methods may be used. In forming a structure in which a thick film having an internal electrode is formed on a substrate, the same method as used in forming the dielectric thick film is preferred.

The electrode should preferably have a resistivity of up to 1 Ω·cm, especially about 0.003 to 0.1 Ω·cm in order to apply an effective electric field across the light emitting layer. The preferred thickness of the electrode is about 50 to 2,000 nm, especially about 100 to 1,000 nm, although it varies with the material of the electrode.

The phosphor thin films of the invention are applicable to a variety of EL panels, for example, full color panels, multi-color panels, and partial color panels of partially representing three colors for display purposes.

EXAMPLE

Examples are given below for illustrating the invention in more detail.

Example 1

An EL device was fabricated using a phosphor thin film according to the invention. For both the substrate and the thick-film insulating layer, a $BaTiO_3$ base dielectric material (permittivity 5,000) was commonly used. A Pd electrode was used as the lower electrode. The device was fabricated by furnishing a green sheet for the substrate, and forming the lower electrode and thick-film dielectric layer on the sheet by a screen printing technique, followed by firing of the overall structure. The surface was then polished, yielding a substrate bearing a thick-film dielectric layer of 30 μm thick. A $BaTiO_3$ film was formed thereon to a thickness of 400 nm by sputtering. This was annealed in air at 700° C., yielding a composite substrate.

On the composite substrate, a multilayer structure of $Al_2O_3$ film (50 nm thick)/ZnS film (200 nm thick)/phosphor thin film (300 nm thick)/ZnS film (200 nm thick)/$Al_2O_3$ film (50 nm thick) was formed. The thin films flanking the phosphor thin film served so that the resulting EL device might produce stable light emission.

The phosphor thin film was formed by the following procedure using an evaporation apparatus constructed as in FIG. 1. Note that a resistive heating evaporation source was used instead of the EB evaporation source 14.

An EB evaporation source 15 containing SrS powder having 5 mol % of EuS added and a resistive heating evaporation source (14) containing $Ga_2S_3$ powder were placed in a vacuum chamber 11, into which a $H_2S$ gas was admitted. The substances were simultaneously evaporated from the respective sources, and deposited on a rotating substrate heated at 400° C., forming a phosphor thin film. The rates of evaporation from the respective sources were adjusted so that the phosphor thin film was deposited on the substrate at a deposition rate of 1 nm/sec. The feed rate of $H_2S$ gas was 20 SCCM. The multilayer structure including the phosphor thin film thus formed was annealed in air at 750° C. for 10 minutes.

For composition analysis purposes, the multilayer structure was also formed on a Si substrate and thereafter, annealed. The conditions under which this multilayer structure was formed and annealed were the same as those used for the above-described multilayer structure in the EL device. The phosphor thin film in the multilayer structure was analyzed for composition by x-ray fluorescence to find an atomic ratio (arbitrary unit) of Sr: 5.91,
Ga: 18.93,
O: 11.52,
S: 48.81, and
Eu: 0.33.

That is, atomic ratios in $Sr_xGa_yO_zS_w$:Eu were

Ga/Sr=y/x=3.20,
O/(S+O)=z/(w+z)=0.191, and
(x+3y/2)/(z+w)=1.04.

By RF magnetron sputtering technique using an ITO oxide target, a transparent ITO electrode of 200 nm thick was formed on the above multilayer structure at a substrate temperature of 250° C., completing the EL device.

Figure 3:
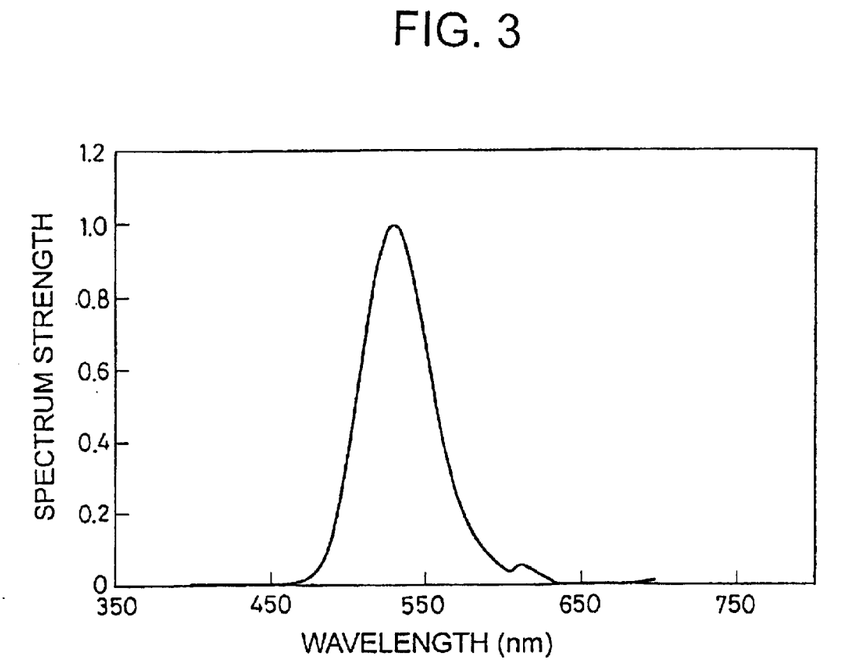
FIG. 3 is a graph showing the emission spectrum of the EL device of Example 1.

When an electric field having a frequency of 1 kHz and a pulse width of 50 μS was applied across the electrodes, the EL device emitted green light having a luminance of 2300 $cd/m^2$ in a fully reproducible manner. The spectrum of light emission is shown in FIG. 3.

Example 2

In Example 1, Tb was used instead of Eu, providing emission of green light at a luminance of 53 $cd/m^2$.

Example 3

In Example 1, one or more of Mg, Ca and Ba were used instead of Sr or together with Sr. Equivalent results were obtained, with emission of bluish green light.

It is noted that in the phosphor thin films formed in Examples 2 and 3, y/x in the compositional formula was in the range of 2.2 to 3.0, z/(w+z) was in the range of 0.13 to 0.33, and (x+3y/2)/(z+w) was in the range of 0.9 to 1.1.

Example 4

An EL device was fabricated as in Example 1 except that the phosphor thin film was formed by the following procedure using In instead of Ga.

In the evaporation chamber shown in FIG. 1, a resistive heating evaporation source was used instead of the EB evaporation source 14. An EB evaporation source 15 containing SrS powder having 5 mol % of Eu added and a resistive heating evaporation source (14) containing $In_2S_3$ powder were placed in a vacuum chamber 11, into which $O_2$ gas was admitted. The substances were simultaneously evaporated from the respective sources, and deposited on a rotating substrate heated at 400° C., forming a phosphor thin film. The rates of evaporation from the respective sources were adjusted so that the film was deposited on the substrate at a deposition rate of 1 nm/sec. The feed rate of $O_2$ gas was 10 SCCM. Annealing was conducted in $N_2$ gas at 750° C. for 10 minutes.

For composition analysis purposes, the multilayer structure including a phosphor thin film was also formed on a Si substrate and thereafter, annealed. The conditions under which this multilayer structure was formed and annealed were the same as those used for the above-described multilayer structure in the EL device. The phosphor thin film in this multilayer structure was analyzed for composition by x-ray fluorescence to find an atomic ratio (arbitrary unit) of Sr: 5.48,
In: 16.81,
O: 6.65,
S: 52.84, and
Eu: 0.28.

That is, atomic ratios in $Sr_xIn_yO_zS_w$:Eu were

In/Sr=y/x=3.07,
O/(S+O)=z/(w+z)=0.111, and
(x+3y/2)/(z+w)=0.94.

Figure 4:
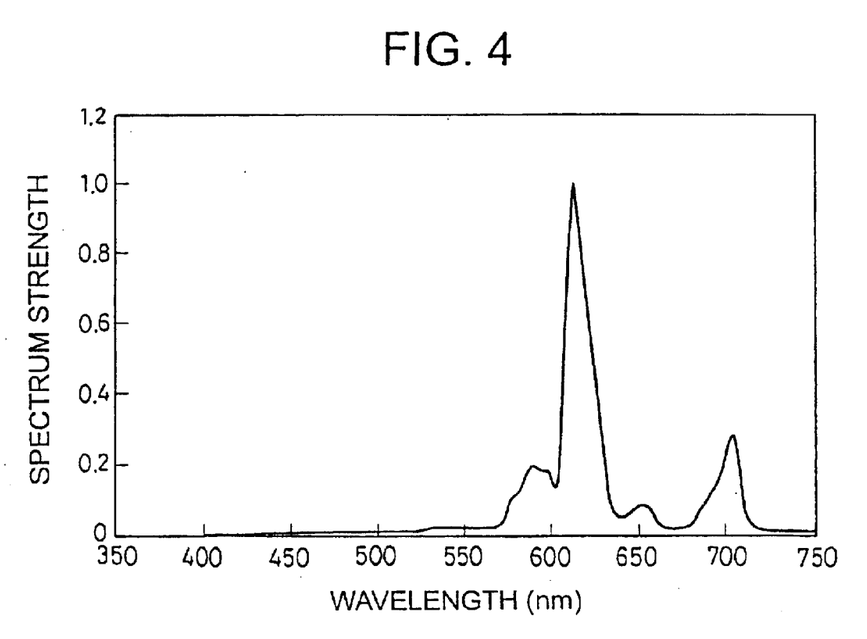
FIG. 4 is a graph showing the emission spectrum of the EL device of Example 4.

The EL device thus obtained was examined for light emission characteristics as in Example 1. The device emitted red light having a luminance of 30 cd/m² in a fully reproducible manner. The spectrum of light emission is shown in FIG. 4.

Example 5

EL devices were fabricated as in Example 1 except that when the phosphor thin film was annealed, at least one parameter of temperature, atmosphere and humidity was changed so as to control O/(S+O) to the value shown in Table 1.

These EL devices were continuously driven under the same conditions as in Example 1 for determining an initial luminance and a luminance half-life (the time taken until the luminance decreased to one-half). The results are shown in Table 1.

TABLE 1

| Device No. | O/(S + O) | Initial luminance at 1 kHz, cd/m² | Luminance half-life, hr |
|---|---|---|---|
| 1 (comparison) | 0.05* | 2080 | 800 |
| 2 | 0.13 | 4430 | 10000 |
| 3 | 0.20 | 5660 | 8000 |
| 4 | 0.27 | 5720 | 1500 |

*outside the limited range

It is evident from Table 1 that when O/(S+O) is 0.1 or greater, the initial luminance becomes high and the emission life is fully prolonged. It is noted that for the phosphor thin films of the respective EL devices which are represented by the compositional formula: $Sr_xGa_yO_zS_w$:Eu, y/x was in the range of 2.2 to 2.7, and (x+3y/2)/(z+w) was in the range of 0.9 to 1.1. The composition of the phosphor thin film was determined by TEM-EDS analysis on a cross section of the device after the luminance evaluation.

The results of TEM-EDS analysis revealed that the phosphor thin films formed in this example and the foregoing examples had been crystallized, with the primary crystal phase being $AB_2S_4$.

Benefits of the Invention

The phosphor thin films of the invention are capable of emitting light of red, green and blue colors and at a satisfactory color purity and are applicable to full color EL panels and multi-color EL panels without a need for filters. The invention also enables to enhance the luminance and lengthen the luminance life of the phosphor thin film by controlling the oxygen content therein. Therefore, inexpensive EL panels having a high luminance and a long lifetime can be fabricated, and the invention is of great worth in the industry.

Since the phosphor thin films of the invention contain as the main component alkaline earth thiogalates and/or alkaline earth thioindates, which are easier to control the composition than alkaline earth thioaluminates, they achieve a high luminance in a well reproducible manner and with minimized variations and their yield is high.

According to the invention, phosphor thin films capable of emitting light of red, green and blue colors are obtainable using materials having analogous chemical or physical properties. Therefore, phosphor thin films of different colors can be formed using an identical film-forming method and film deposition apparatus, which simplifies the process of fabricating full color EL panels and reduces the manufacturing cost thereof.

What is claimed is:

1. A phosphor thin film comprising a matrix material and a luminescent center, wherein the matrix material is an oxysulfide containing at least
an alkaline earth element,
at least one of Ga and In,
sulfur (S), and
oxygen (O);

the atomic ratio of oxygen to the total of oxygen and sulfur, O/(S+O), in said matrix material is in a range of from 0.1 to 0.85.

2. The phosphor thin film of claim 1, wherein the phosphor thin film has the following compositional formula:

$$A_xB_yO_zS_w:M$$

where

M is a metal element serving as the luminescent center,

A is at least one element selected from the group consisting of Mg, Ca, Sr, and Ba, B is at least one element selected from Ga, In and Al, with the proviso that B is at least one of Ga and In, x is in the range of 1 to 5, y is in the range of 1 to 15, z is in the range of 3 to 30, and w is in the range of 3 to 30.

3. The phosphor thin film of claim 1 or 2 wherein the luminescent center is provided by a rare earth element.

4. A phosphor thin film comprising a matrix material and a luminescent center, wherein said matrix material is an oxysulfide containing at least
an alkaline earth element,
Ga and In,
sulfur and
oxygen, and luminescent center is Eu.

5. An EL panel having the phosphor thin film of claim 1.

* * * * *